Patented Nov. 2, 1937

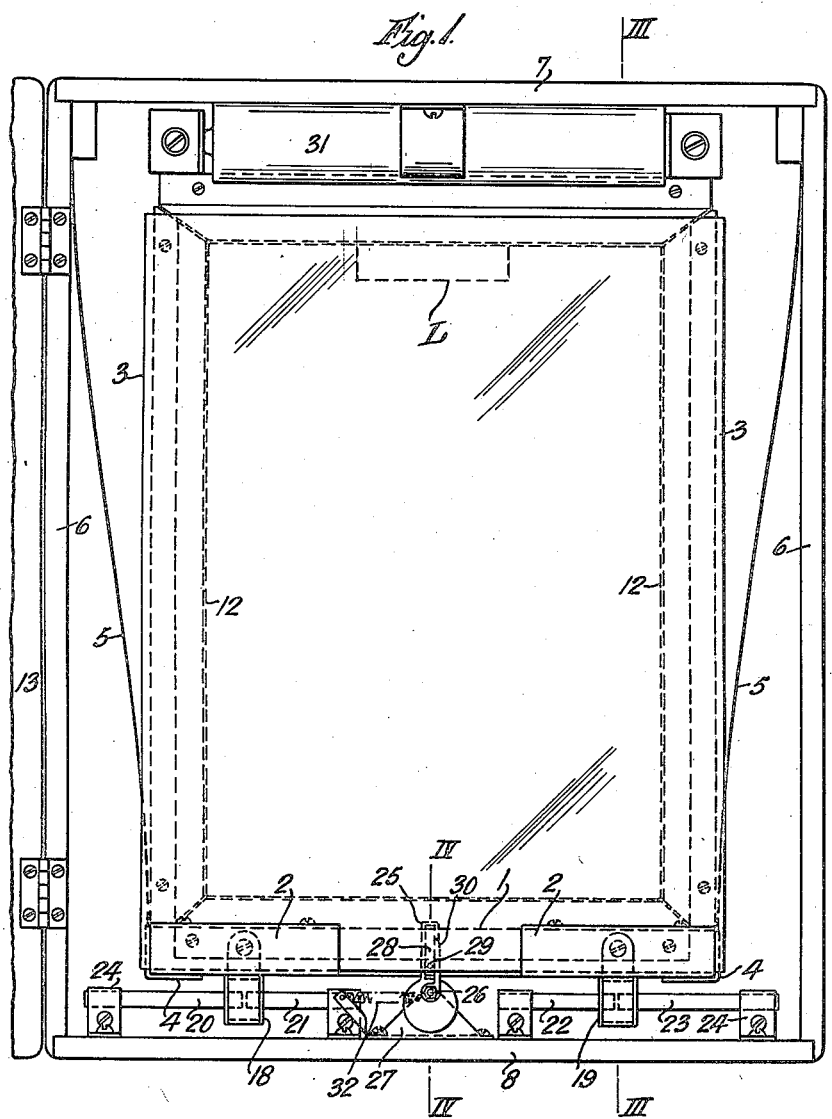

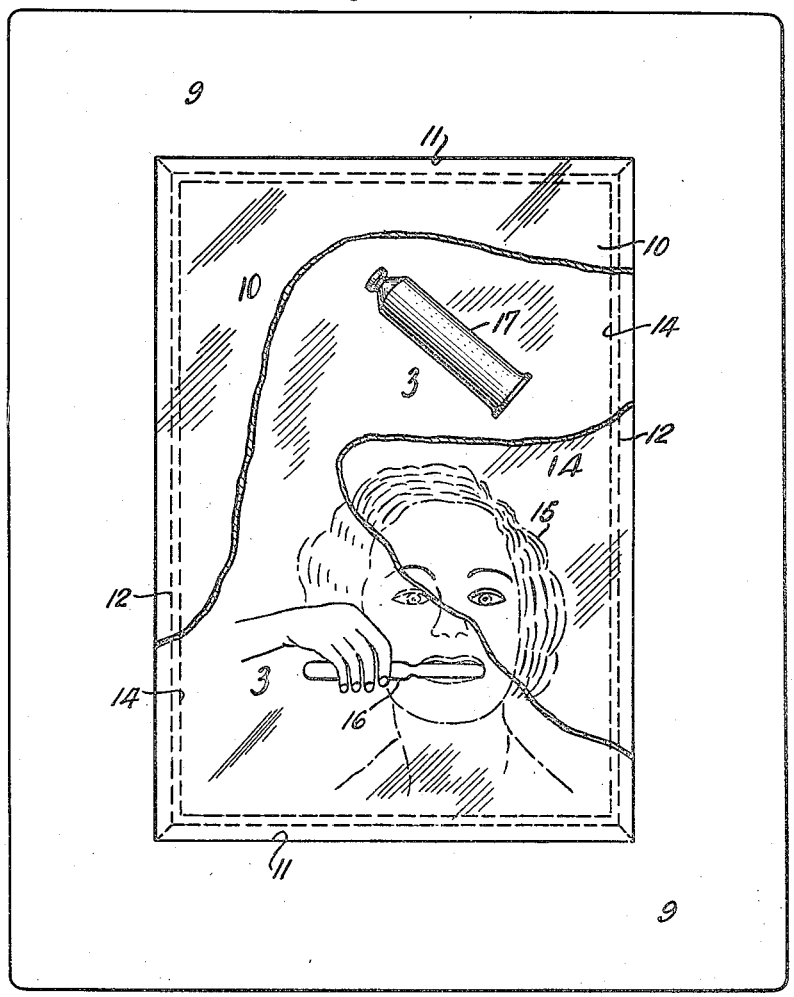

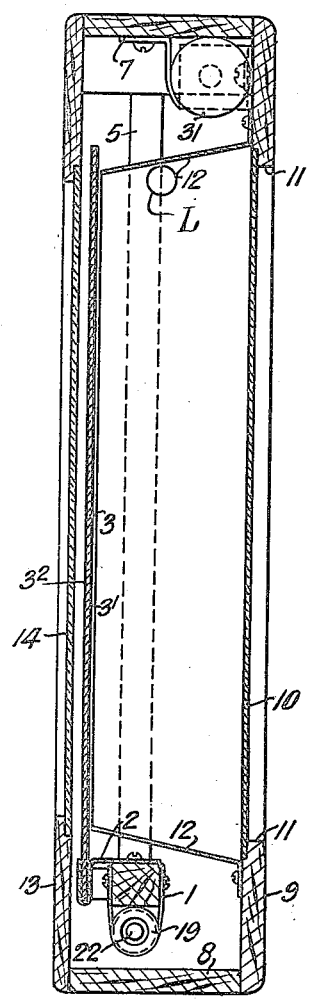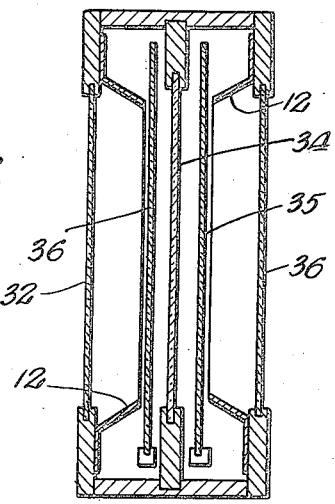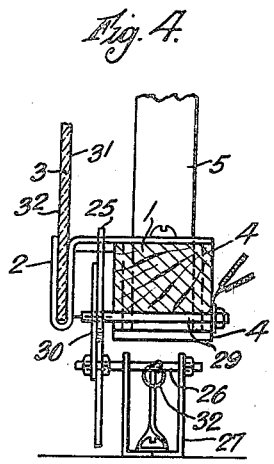

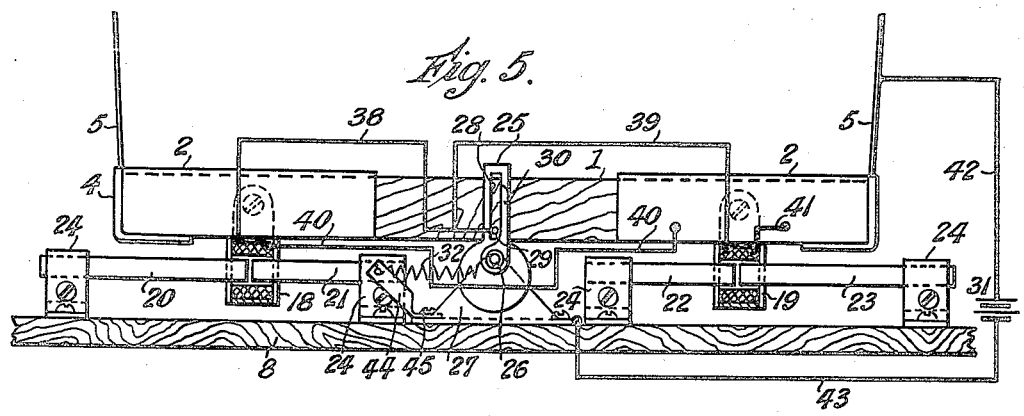
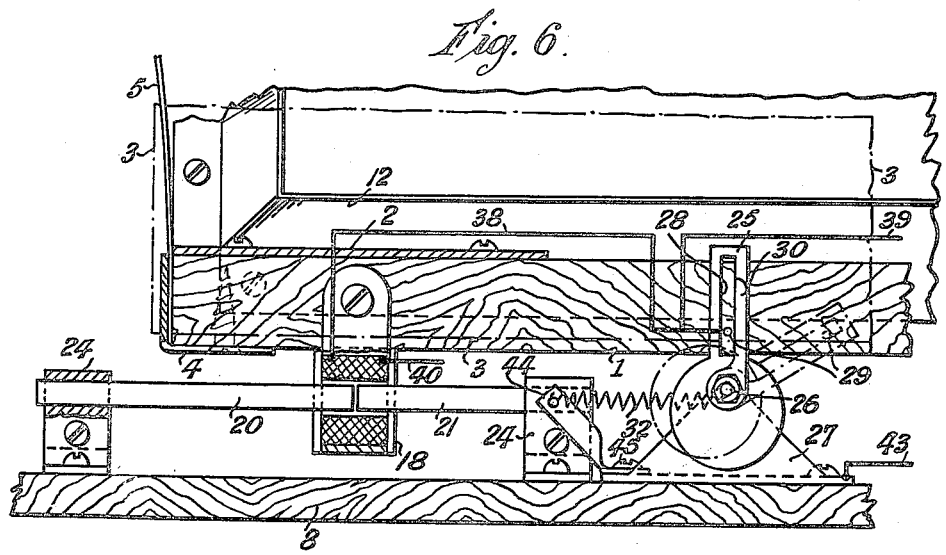

2,098,143

UNITED STATES PATENT OFFICE

2,098,143

ADVERTISING OR DISPLAY DEVICE

Hamilton Grey, London, and Arthur Samuel Waddington, Crayford, Kent, England, assignors to Le Vane's Patents, Limited, London, England Application March 17, 1936, Serial No. 69,370
In Great Britain April 2, 1935

11 Claims. (Cl. 40—139)

This invention relates to advertising or display devices.

According to the present invention an advertising or display device comprises an opaque frame or casing provided with opposite front and rear openings closed by transparent material to provide viewing apertures, means located within the frame for supporting at least one sheet of transparent material for movement within the frame and with its faces between the apertures, and means located within the frame for effecting movement of the sheet (or sheets), the said frame masking from view through both apertures the said supporting and moving means and also the edge of the sheet (or each sheet) in all positions to which it moves whereby an article (or part of an article) to be displayed and applied to the sheet (or sheets) appears, as viewed through both front and rear apertures to be floating. It is preferred to constitute the supporting means by flexible strips connected at their lower ends to the movable sheet and at their upper ends to the frame or casing, the said strips permitting the sheet to have oscillatory movement within the casing.

It is also preferred to provide an electromagnetic device for effecting oscillatory movement of the sheet, the said device and an electrical power source being enclosed within and masked by the frame or casing.

The invention is illustrated in the accompanying drawings in which:

Figure 1 is a rear elevation of a device embodying the invention;

Figure 2 is a front elevation thereof with parts broken away to show parts in the rear thereof;

Figure 3 is a vertical section on the line III—III of Figure 1;

Figure 4 is a detail section taken on the line IV—IV of Figure 1 and drawn on an enlarged scale;

Figure 5 is a wiring diagram and showing some parts of the structure in vertical section and some in elevation;

Figure 6 is a detail view showing a contact making device and drawn on an enlarged scale; and Figure 7 is a sectional view of a modification.

Referring to the drawings there is provided a horizontal supporting bar 1 having secured to it clips 2 which receive the lower edge of a plane sheet 3 of glass which is thus held in a vertical plane. To each end of the bar 1 is secured a corner bracket 4 to which the lower ends of strip 5 of flexible and preferably resilient metal such as spring steel are secured while the upper ends of the two strips 5 are secured to the inner surface of the vertical side walls 6 of a frame or casing within which the glass and strips are contained. The side 6 and the upper and lower walls 7, 8 of the casing are formed of opaque material such as wood or metal and the front face 9 of the casing includes a frame of opaque material having secured to it a second sheet 10 of glass which is parallel with the first sheet 3; adjacent the "sight" edges 11 of the frame 9 there is secured an inturned flange arrangement 12, this flange extending adjacent one face of the first sheet 3 of glass or in other words bridging the gap between the first and second sheets 3, 10, the sight dimension of the flange being such that the edges of the first sheet 3 of glass and also the strips 5 never move into a position in which the edges are visible through the second sheet of glass 10. The rear of the casing is formed by a hinged door 13 having a sheet 14 of glass similar to the front of the casing and positioned parallel and closely adjacent the first sheet 3 so that vision can be obtained through the three sheets 3, 10, 14 of glass as bounded by the sight of the flange arrangement 12 and the "sight" of the door 13.

In other words, the frame or casing masks the strips 5 and the edges of the sheet 3 from view through the sheets 10 and 14.

If now a device to be displayed or advertised be secured to one of the faces of the first sheet 3 of glass (preferably to the face $3^1$) and movement be imparted to the sheet 3 the device will, as viewed from outside the casing from both the front sheet of glass 10 and the rear through the rear sheet 14 seem to move to and fro without there being any apparent support for it.

For example, a bottle could be secured to the first sheet 3 of glass and descriptive matter could be applied to the sheets 10 and/or 14 of glass, the bottle moving relatively to the descriptive matter. An example of the use of the device for advertising tooth paste is shown in the drawings. A representation 15 of a human face could be applied to the third sheet 14 of glass and a brush 16 applied to the first sheet 3 of glass, so that the face would be stationary and the brush movable, the brush being mounted on the rear face $3^2$ of the first sheet 3 of glass; a tube 17 of tooth paste to be displayed could be applied to the front face $3^1$ of this sheet 3, the tube being if desired pivoted on the sheet so as to oscillate as the sheet is moved.

By making the strips 5 sufficiently long, the motion of the glass 3 and hence the device thereon will be sensibly rectilinear and the strips provide for an easy suspension requiring but little power to keep the glass in motion.

The mechanism illustrated for effecting movement of the horizontal bar 1 and hence of the first sheet 3 of glass comprises an electrical solenoid arrangement which is energized by a battery the circuit of which is controlled by a switch itself opened and closed by the movement of the bar 1: in the construction shown two coils 18, 19 are secured in spaced relationship to the lower face of the bar 1 and the bobbins of the coils are threaded respectively over rods 20, 21, 22, 23 carried by brackets 24 secured to the lower wall 8 of the casing, the rods 20 and 23 constituting magnets and the rods 21 and 22 being formed of non-magnetic material; the junction between the two metals occurs in the region of the respective coils 18, 19 when the bar 1 is at rest. To effect the energizing and de-energizing of the coils, there is provided a switch which is intermittently closed by the movement of the bar; the switch consists of an arm 25 formed of insulating material and fast on a horizontal pivot pin 26 carried by a bracket 27 secured to the lower wall 8 of the casing: this arm has formed in it a radial slot 28 into which extends with clearance a pin 29 on the supporting bar 1: also carried on the arm 25 and connected electrically to the pivot pin 26 is a wiper contact 30 which is located on one side only of the slot 28. The pin 29 on the bar is connected through lines 38, 39 with one side of each of the coils 18, 19, the other sides of which are connected through lines 40, 41 with one of the brackets 2 which is of metal and is itself connected through one of the metal strips 5 to a line 42 connected to one side of the battery 31. The other side of this battery is connected through a line 43 to the bracket 27 which is of metal in which the pivot pin 26 is mounted, the pivot pin 26 and the wiper 30 being, as previously stated, in electrical connection. Thus, there is provided a circuit, the opening and closing of which is controlled by contact making and breaking between the wiper 30 and the pin 29. To ensure firm contact between the pivot pin 26 and the bracket 27, the pivot pin is pulled down on the bracket by a light spring 32 which at one end is connected to the pivot pin 26 and at the other end to an inclined arm 44 secured by a screw 45 to the bracket 27. The coils 18, 19 are so wound and the rods or magnets 20, 23 so arranged as to polarity that when the coils are energized the coil 19 is drawn on to the associated rod 23 and the other coil 18 is repelled from the associated rod 20, the two effects thus assisting one another to urge the bar 1 to the right as seen in Figure 1, movement to the left being produced by the weight of the bar 1, glass 3 and associated parts. It will be apparent that if the bar 1 were displaced from its central position and then released, it would swing or move to and fro. If it be assumed that the bar 1 is moving to the right, it will be seen that the pin 29 is in engagement with the right hand wall of the slot 28 and also with the wiper 30. This engagement with the wiper 30 closes the circuit between the battery 31 and the coils 18, 19 which produce the movement of the bar 1 to the right. This continues until the pin 29 leaves the top of the wiper 30 (as is shown in dotted lines in Figure 6) whereupon the circuit is broken and the bar 1 ceases to be driven by the coils 18, 19 to the right. The bar 1 will (due to its momentum) move very slightly further to the right and will then commence to reverse or to move to the left. The arm 25 is very light and is also frictionally damped by its pin 26 being pulled by the spring 32 on to its bracket 27. Hence the arm 25 has little or no momentum so that as soon as the pin 29 ceases to move to the right the arm 25 will come to rest. Hence, before the pin 29 (which has now reversed) can move the arm 25 in an anti-clockwise direction, the pin 29 has to take up the clearance between itself and the left hand wall of the slot 28 and when this occurs the movement of the pin 29 to the left drives the arm 25 in an anti-clockwise direction. It is to be observed that because of this clearance, contact between the pin 29 and the wiper 30 is not established during this movement to the left which continues until the bar 1 has moved to its extreme left hand position. The bar 1 now commences to reverse or to move to the right and, as has been described, before the pin 29 can drive the arm 25 in a clockwise direction, the pin has to take up the clearance now between itself and the right hand wall of the slot 28. Once this has been effected, the arm 25 is moved in a clockwise direction as the pin 29 moves to the left, and it will be seen that during this movement the pin slides first down the wiper 30 and then up the wiper until, when the pin is near the limit of its movement to the right, the pin leaves the top of the wiper. The bar 1 and pin 29 will now reverse and the cycle of operations described will be repeated.

It will now be apparent that when the pin 29 makes contact with the wiper 30, the circuit between the coils 18, 19 and the battery 31 will be closed so energizing the coils which drive the bar 1 to the right, the energization of the coils ceasing when the pin 29 leaves the wiper 30 and allowing the bar 1 to reverse and so on. Thus, as the supporting bar 1 is moved the coils are intermittently energized so that by initially setting the bar into motion, the solenoid arrangement maintains the bar in motion, very little power being required to effect the maintenance of the motion.

A lighting installation indicated by the lamp L in Figures 1 and 3 may be fitted in, or upon any part of the device, means being provided for switching the installation on and off according to requirements.

To enhance the value of the device an arrow or the like could be employed and operated in conjunction with the moving glass and pointing on and off to a written notice or the like.

It will be obvious that the invention is not limited to the particular construction described, for example the first sheet 3 of glass may be supported for movement other than a sensibly horizontal rectilinear one, e. g. the glass may be supported to have an up and down movement, an arcuate movement or a combination of such movements. Moreover, as shown in Figure 7 more than one moving sheet of glass can be provided, the various sheets of glass carrying separate devices or components of a composite device, for example, and referring to Figure 7 the device could have five sheets of glass 32–36 two of which 33, 35 would be movable and the other three 32, 34, 36 stationary, two of the stationary ones being carried by the front and rear of the casing and the third stationary sheet being carried inside the casing and between the two movable sheets.

The sheets of glass may be of various shapes, e. g. flat, circular, semi-circular, spherical or conical to produce different results.

It will be apparent that the sheets could be of other transparent material than glass.

What we claim is:—

1. An advertising or display device comprising in combination an opaque casing member provided with opposed front and rear openings, transparent members closing the said openings to provide front and rear viewing apertures, a sheet of transparent material having a device to be displayed applied thereto and movable therewith, means which are located within the casing and support the sheet for movement within the casing and with its faces between the viewing apertures, and means, located within the casing, operating to effect movement of the said sheet, the said casing masking from view, through both apertures, the supporting means, the moving means and also the edge of the sheet in all positions to which it is moved.

2. An advertising or display device comprising in combination an opaque casing member provided with opposed front and rear openings, transparent members closing the said openings to provide front and rear viewing apertures, a plurality of sheets of transparent material having applied thereto parts of the device to be displayed, means which are located within the casing and support the sheets for movement within the casing and with their faces between the viewing apertures, and means located within the casing, operating to effect movement of the sheets, the said casing masking from view, through both front and rear viewing apertures, the supporting means, the moving means and the edges of the sheets in all positions to which they are moved.

3. An advertising or display device comprising in combination an opaque casing member provided with opposed front and rear openings, transparent members closing the said openings to provide front and rear viewing apertures, a sheet of transparent material having a device to be displayed applied thereto and movable therewith supporting strips located within the casing, means securing the upper ends of the strips to the lower part of the sheet so that the sheet is supported for movement within the casing with its faces between the viewing apertures, and means located in the casing and operating to effect movement of the sheet, the said casing masking from view, through both apertures, the supporting strips, the moving means, and also the edge of the sheet in all positions to which it is moved.

4. An advertising or display device comprising in combination an opaque casing member provided with opposed front and rear openings, transparent members closing the said openings to provide front and rear viewing apertures, a sheet of transparent material having a device to be displayed applied thereto and movable therewith, supporting strips located within the casing, means securing the upper ends of the strips to the casing, a carrier receiving the lower portion of the sheet, means connecting the lower ends of the strips to the carrier so that the sheet is supported for movement within the casing with its faces between the viewing apertures, and means located in the casing and operating to effect movement of the sheet, the said casing masking from view, through both apertures, the supporting strips, the moving means, and also the edge of the sheet in all positions to which it is moved.

5. An advertising or display device comprising in combination an opaque casing member provided with opposed front and rear openings, transparent members closing the said openings to provide front and rear viewing apertures, a sheet of transparent material having a device to be displayed applied thereto and movable therewith, means located within the casing and supporting the sheet for oscillatory movement within the casing and with its faces between the viewing apertures, an electro-magnetically operable device to effect oscillatory movement of the sheet, a circuit make and break device controlling the energization of the electro-magnetically operable device, and means, operable by the movement of the sheet, operating to actuate the make and break device, the casing masking from view through both apertures the said supporting means, the devices and the edges of the sheet in all positions to which it is moved.

6. A device as claimed in claim 5 and in which the electro-magnetically operable device comprises a solenoid carried by a carrier supporting the sheet, and a stationary magnetized rod over which the solenoid is mounted to oscillate.

7. A device as claimed in claim 5 and in which the contact make and break device comprises a pivotally mounted arm having a slot one wall of which carries a contact and in which the sheet is carried by a carrier having a pin entering the slot and constituting a second contact arranged to engage the first contact when the sheet moves in one direction and to leave the first contact when the sheet moves in the other direction.

8. An electrically operable portable advertising or display device comprising a casing having opposed viewing apertures, a sheet of transparent material having a device to be displayed applied thereto and movable therewith, means supporting the sheet for movement within the casing and with its faces between the viewing apertures, an electrically operable device effecting movement of the sheet and a source of electrical power housed within the casing, the said casing being formed of opaque material and arranged to mask from view, from any point external of the casing, the said supporting and moving means, the source of power, and the edge of the sheet in all positions to which it moves.

9. An advertising device comprising a housing, a transparent window in the front wall of said housing, a transparent plate within the housing carrying an object to be displayed through said window, means for guiding said transparent plate for reciprocating movement, means in said housing at the ends of said window for concealing the ends of said transparent plate from the view of an observer looking through said transparent window, said transparent plate being longer than said window and having its ends projecting at all times beyond the ends of said window and beyond said concealing means, and means arranged in said housing beyond one end of the window and beyond the adjacent concealing means and operatively associated with the adjacent end of said transparent plate for causing reciprocating movement of the latter.

10. An advertising or display device comprising in combination an opaque casing member provided with opposed front and rear openings, transparent members closing the said openings, a sheet of transparent material having a device to be displayed applied thereto and movable therewith, means which are located within the casing and support the sheet for movement within the casing and with its faces between the said openings, and means, located within the casing, operating to effect movement of the said sheet, the said casing masking from view the supporting means, the moving means and also the edge of the sheet in all positions to which it is moved, when viewed through the front opening.

11. An electrically operable portable advertising or display device comprising a casing having opposed front and rear openings, a sheet of transparent material having a device to be displayed applied thereto and movable therewith, means supporting the sheet for movement within the casing and with its faces between the said openings, an electrically operable device effecting movement of the sheet, the said casing being formed of opaque material and arranged to mask from view, from any point external and in front of the casing, the said supporting and moving means, and the edge of the sheet in all positions to which it moves.

HAMILTON GREY.
ARTHUR SAMUEL WADDINGTON.